R. Wyatt.

Fire Escape.

No. 2,735. Reissued Aug. 20, 1867.

Witnesses.
Geo. W. Reed
A. Schlegel

Inventor:
Robert Wyatt

N. PETERS, PHOTO-LITHOGRAPHER, WASHINGTON, D. C.

United States Patent Office.

AMERICAN FIRE-ESCAPE AND FIREMAN'S LADDER COMPANY, OF NEW YORK, N. Y., ASSIGNEES OF ROBERT WYATT.

*Letters Patent No.* 48,333. *dated June* 20, 1865; *reissue No.* 2,735, *dated August* 20, 1867.

IMPROVED FIRE-ESCAPE.

The Schedule referred to in these Letters Patent and making part of the same.

Be it known that ROBERT WYATT, of Brooklyn, in the county of Kings, and State of New York, did invent a new and useful Fire-Escape, for which Letters Patent were granted to him dated the 20th day of June, 1865, on an insufficient and defective specification. We do hereby declare and ascertain his invention in the following description, in which reference is made to the original drawing, as follows.

Figure 3:
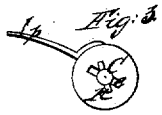
Figure 4:
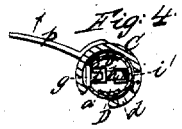
Figure 5:
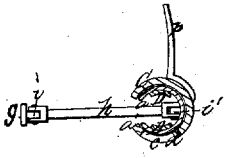

Figures 3, 4, and 5 are a plan and cross-sections of the apparatus.

The purpose of this invention is to furnish a fire-escape that can be permanently or otherwise secured to the exterior of a house or other convenient and safe part of a building, which will not obstruct the side-walk or passages where it is located, or deface the building; said fire-escape being accessible and readily put into use from any floor of the building, while it is guarded from use by burglars, &c., on the outside. This ladder can also be used wherever it may be wanted for other purposes. It is obvious that no specific form of the several parts or proportions is essential, this being determined by the service in which it is employed. For instance, the outer case, when the apparatus is closed, may be in the form of a cylindrical tube, as the drawing represents, or a polygonal or other figure; so the rounds or steps may be of any desired and convenient length, and the joints and fastenings may be any well-known construction that will best answer the purpose of strength, security, and durability, as well as the specific requirements for the place it is intended to be placed in.

Figure 1:
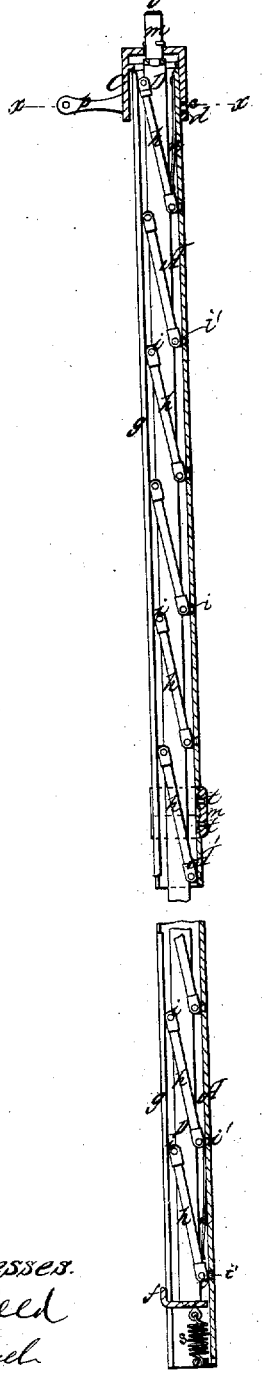
Figure 1 is a vertical central section, closed up when not in use.
Figure 2:
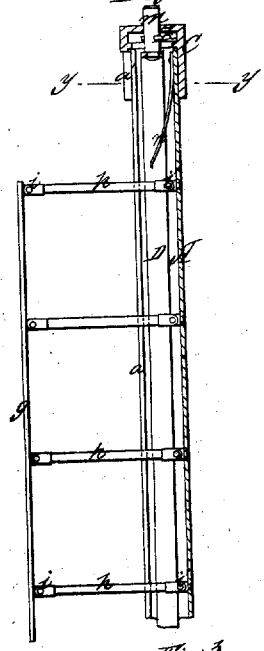
Figure 2 is a similar section of the apparatus, opened for use.

The case that forms the exterior of the apparatus when closed is formed in two parts or segments divided longitudinally, and these segments may each be in one or more pieces firmly united, as seen at *m*, fig. 1. The segment-piece A, which forms the stationary side of the apparatus, is affixed in any convenient way to the side of the building in an upright position, and extending from the ground up to the upper stories. On the inner side of this stationary segment A, which forms one of the side pieces of the ladder, is jointed a series of rounds or rods which forms the steps *h* of the ladder. The joints *i* should be simple rule or hinge-joints, as clearly represented in the drawing. The other ends of the rods are jointed to the segment *g* of the case, which forms the other side of the ladder, and when closed up into the position shown in fig. 1, it forms one side of the case enclosing the rounds or rods *h*, and protecting them from the weather or other injury. The rods *h* may be made of tubing for lightness, or solid, as desired. A forked or other bar, D, extends from top to bottom, or nearly so, within the tube, and is connected at the top and below with a proper catch that will securely fasten and hold the two segments of the case closed together in position, fig. 1, so that no person outside and below can open the case and bring the ladder into position for use, as in fig. 2. The fastening shown in the drawing consists of a catch, *f*, affixed to the lower end of the bar D, which catches under the end of the segment *g*, which forms the movable side of the ladder and holds it in place. C is a cap covering the upper end of the case A, on which it turns, with an opening in the side to allow the movable segment *g* to escape, and when the said segment is brought into place and the cap turned, the upper end is fastened. These fastenings are not *per se* new, and they are, in fact, but examples of numerous well-known devices that could be used to catch, bolt, or fasten the two halves of the case together, so as to only be unfastened from above. To liberate the movable segment *g*, an arm, *p*, is affixed to the cap C, by which it is turned so as to bring its opening opposite the said segment *g*, and by the same movement the bar D is released and unfastens the catch *f* below, together with any intermediate catch or fastening, and the movable segment falls into position seen in fig. 2, and the ladder is ready for use. It will be obvious that a cord or wire leading from the arm *p* down to any or each story will serve to give it motion, which can be effected by persons on any story of the building, while there is no communication with it from the outside, and consequently it cannot be used for burglarious purposes. If the segments tend to stick together their separation may be facilitated by a spring, *n*, or other equivalent device, which throws out the movable segment when relieved from the catches.

Having thus fully described the new fire-escape, what we claim, and desire to secure by Letters Patent, is—

1. The apparatus, composed of a divided case, A and *g*, composing the two sides of the ladder, and hinged together by a series of rounds or steps, *h h*, and secured substantially as and for the purposes herein set forth, the whole forming a fire-escape ladder.

2. The fastening, substantially as herein described, whereby the two segments forming the sides of the ladder are held securely together and locked against improper interference, for the purposes set forth.

E. S. VAUGHAN,

*President of the American Fire-Escape and Fireman's Ladder Company, Assignees of Robert Wyatt's Original Letters Patent.*

Witnesses:

J. J. GREENOUGH.